United States Patent Office 2,921,091
Patented Jan. 12, 1960

2,921,091

N¹-CARBAMIDOMETHYL-N²-(β-HYDROXY-ETHYL) UREA

Seymour L. Shapiro, Hastings on Hudson, and Louis Freedman, Bronxville, N.Y., assignors to U.S. Vitamin and Pharmaceutical Corporation, New York, N.Y., a corporation of Delaware No Drawing. Application December 29, 1958
Serial No. 783,204

1 Claim. (Cl. 260—553)

This invention is concerned with $N^1$-carbamidomethyl-$N^2$-($\beta$-hydroxyethyl)urea which is a stable, water-soluble, crystalline compound of low toxicity with excellent anti-inflammatory activity and as such is useful in human and veterinary medicine.

Example 1

A solution of 9.7 g. (0.075 mole) of carbethoxymethyl isocyanate in 50 ml. of ethyl acetate was treated with 4.62 g. (0.075 mole) of ethanolamine. After standing several hours the formed crystals, 11.85 g. (83%) of $N^1$-carbethoxymethyl-$N^2$-($\beta$-hydroxyethyl)urea was separated, M.P. 74–77° C. This intermediate urea compound did not show anti-inflammatory activity.

A solution of the urea above, 4.0 g. (0.021 mole) in 20 ml. of MeOH was saturated with ammonia, maintaining the internal temperature below 15° C. by external cooling. After storage for 72 hours at 20° C. the carbamido urea, 1.65 g., precipitated and recrystallized (ethanol), melted at 159–161° C.

Analysis.—Calcd. for $C_5H_{11}N_3O_3$: C, 37.3; H, 6.9; N, 26.1. Found: C, 37.8; H, 6.8; N, 26.4.

This was the product which had a minimum lethal dose of 750 mg./kg. subcutaneous in mice, and showed an anti-inflammatory activity of 15 units per gram (see Shapiro et al., J. Am. Pharm. Assoc., Sci. Ed. 46, 333 (1957), for method of testing).

The novel compound of this invention can be combined with solid or liquid pharmaceutical carriers and formulated into the form of tablets, powder packets or capsules, or dissolved in suitable solvents for oral and parenteral administration for human or veterinary use.

It is to be understood that it is intended to cover all changes and modifications of the example herein chosen for the purpose of illustration which do not constitute departures from the spirit and scope of the invention.

We claim:

The compound

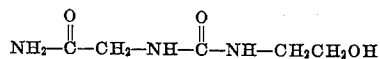

No references cited.